P. K. DEDERICK.
Horse-Powers.
No. 151,011. Patented May 19, 1874.
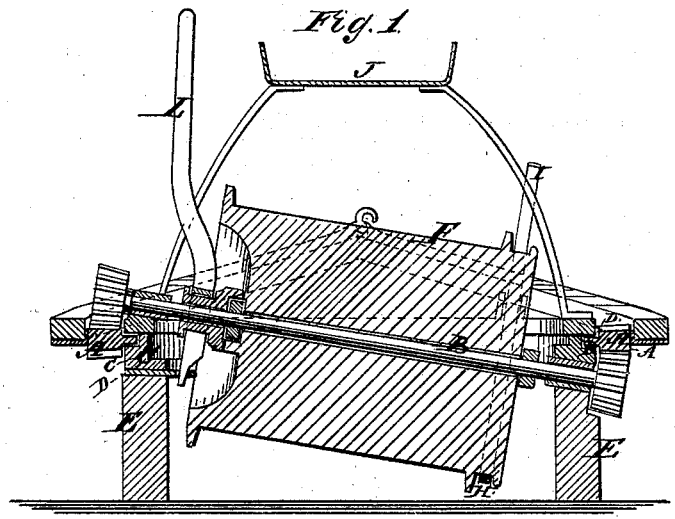
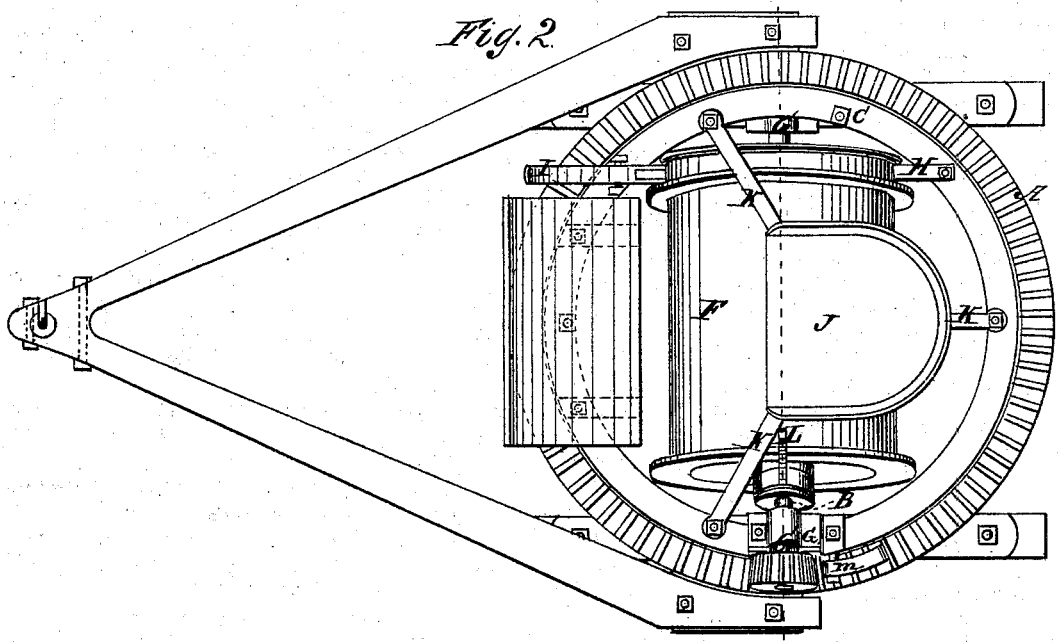
Witnesses:
E. Wolff
Inventor:
P. K. Dederick
Per
Attorneys.

UNITED STATES PATENT OFFICE.

PETER K. DEDERICK, OF ALBANY, NEW YORK.

IMPROVEMENT IN HORSE-POWERS.

Specification forming part of Letters Patent No. 151,011, dated May 19, 1874; application filed July 26, 1873.

*To all whom it may concern:*

Be it known that I, PETER K. DEDERICK, of Albany, in the county of Albany and State of New York, have invented a new and Improved Horse-Power, of which the following is a specification:

In a patent granted to me for improvement in horse-powers, June 25, 1872, I represented a plan of arranging the shipping-connections within a hollow journal, on which revolves the large drive-wheel, having the drum arranged under it in a manner calculated to facilitate the simplification of such machines, the bore of said wheel being made large and fitted on a hollow stationary center or journal.

In my present invention I propose to show how that plan is available for further simplifying such machines, and economizing space by greatly enlarging the central opening or the hollow stationary center circle or journal, so that I can arrange the drum itself within the hollow journal, and thus materially lessen the height of the machine as well as obtain other advantages. Hence, my invention consists of a stationary circle or hollow center within which the drum is located, and which forms the journal for the wheel.

Figure 1 is a longitudinal sectional elevation of my improved horse-power, taken on the line *x x*, Fig. 2; and Fig. 2 is a plan view.

Similar letters of reference indicate corresponding parts.

A is the large horizontal drive-wheel, which is toothed both on the upper and lower sides, and gears with both ends of the counter-shaft B, which is arranged diagonal to the horizontal plane of the drive-wheel, and geared at one end with the under side, and at the other end with the upper side, and I employ a hollow stationary circle or journal, C, as in my patent above alluded to, but enlarge it, and fit the bore or hub D in an annular groove in the periphery of the aforesaid stationary rim or journal, thus protecting the bearing from dirt or dust, as in all journals and bores of smaller size, thereby materially reducing the wear and friction, or the groove may be formed in the hub instead of the journal with precisely the same results. The center or hollow journal C I mount on a stationary platform, E, which, by this plan, is not required to be so high as in the other, because the enlargement of the hollow stationary journal admits of mounting the drum F on the shaft B within it instead of below it, as in the aforesaid patent; furthermore, the stationary circular center affords support for the journal-bearings C, which are bolted to it as well as for the brake-strap H and the brake-lever I, which are mounted on it, and it also affords support for the seat J, which is mounted on it by the legs K. L represents the shipper-lever, for coupling and uncoupling the shaft and drum, as usual in such machines. This lever and the clutch are also arranged within the drive-wheel and stationary center or journal. M is a retaining-pawl, pivoted on the center C, and arranged in connection with the teeth of the face of the drive-wheel, so as to prevent it from turning back to allow the team to stop while the weight is suspended.

Having thus described my invention, I claim as new and desire to secure by Letters Patent—

1. The hollow journal or circle C, substantially as and for the purpose specified.
2. The combination of the stationary circle or hollow journal C, diagonal shaft B, and drive-wheel A, substantially as specified.
3. The hollow stationary journal C and retaining-pawl M, in combination with the drive-wheel, substantially as specified.

P. K. DEDERICK.

Witnesses:
  A. M. DEDERICK,
  DAVID DE TIERE.